(12) United States Patent
Koo et al.

(10) Patent No.: US 10,133,099 B2
(45) Date of Patent: Nov. 20, 2018

(54) METHOD OF MANUFACTURING A DEVICE SUBSTRATE AND A DISPLAY DEVICE MANUFACTURED USING THE SAME

(71) Applicant: SAMSUNG DISPLAY CO., LTD., Yongin-si, Gyeonggi-Do (KR)

(72) Inventors: Hyunwoo Koo, Hwaseong-si (KR); Taewoong Kim, Yongin-si (KR); Sunho Kim, Seongnam-si (KR); Danbi Choi, Suwon-si (KR)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 0 days.

(21) Appl. No.: 15/485,667

(22) Filed: Apr. 12, 2017

(65) Prior Publication Data
US 2017/0219868 A1 Aug. 3, 2017

Related U.S. Application Data

(62) Division of application No. 14/454,089, filed on Aug. 7, 2014, now Pat. No. 9,645,421.

(30) Foreign Application Priority Data

Jan. 9, 2014 (KR) .................. 10-2014-0002950

(51) Int. Cl.
*G02F 1/1333* (2006.01)
*B29C 70/88* (2006.01)
(Continued)

(52) U.S. Cl.
CPC ........ *G02F 1/133305* (2013.01); *B29C 70/88* (2013.01); *B29K 2079/08* (2013.01);
(Continued)

(58) Field of Classification Search
CPC ............ G02F 1/1333; G02F 1/133305; G02F 1/133345; G02F 1/1303; G02F 1/167; G02F 1/133351; G02F 2202/28; G02F 2202/023; B32B 2457/20; B32B 2457/202; B32B 7/06; B32B 7/12; B32B 43/006; B32B 27/08; B32B 27/281; B32B 27/283; B32B 27/365; B32B 2379/08; B32B 38/10;
(Continued)

(56) References Cited

U.S. PATENT DOCUMENTS 8,445,300 B2 * 5/2013 An .................. B29D 11/0073
257/E21.158
2003/0025118 A1 2/2003 Yamazaki et al.
(Continued)

FOREIGN PATENT DOCUMENTS

KR 1020080004067 1/2008
KR 1020090009335 1/2009
(Continued)

*Primary Examiner* — Thoi Duong
(74) *Attorney, Agent, or Firm* — F. Chau & Associates, LLC (57) ABSTRACT

A device substrate manufacturing method includes forming a debonding layer on a carrier substrate. An inorganic adhesive layer is formed on at least a portion of the debonding layer. A process substrate is formed on the carrier substrate. A device is formed on the process substrate, and the process substrate is separated from the carrier substrate.

16 Claims, 9 Drawing Sheets

(51) Int. Cl.
- *B29L 9/00* (2006.01)
- *B29L 31/34* (2006.01)
- *B29K 79/00* (2006.01)
- *B29K 83/00* (2006.01)
- *G02F 1/1339* (2006.01)
- *G02F 1/1341* (2006.01)
- *G02F 1/1343* (2006.01)
- *G02F 1/1362* (2006.01)
- *G02F 1/1368* (2006.01)

(52) U.S. Cl.
CPC ....... *B29K 2083/00* (2013.01); *B29L 2009/00* (2013.01); *B29L 2031/3475* (2013.01); *G02F 1/1339* (2013.01); *G02F 1/1341* (2013.01); *G02F 1/1368* (2013.01); *G02F 1/13439* (2013.01); *G02F 1/134309* (2013.01); *G02F 1/136286* (2013.01); *G02F 2001/13415* (2013.01); *G02F 2201/121* (2013.01); *G02F 2201/123* (2013.01); *G02F 2202/023* (2013.01); *G02F 2202/28* (2013.01); *Y10T 428/1064* (2015.01)

(58) Field of Classification Search
CPC ........ B32B 2037/268; B32B 2307/748; B32B 2405/00; B32B 37/26; B32B 37/12; B32B 37/1284; B32B 37/1292; B32B 2250/02; B32B 2250/03; B32B 2255/26; B32B 2333/12; B32B 2363/00; B32B 2367/00; B32B 2369/00; B32B 17/10798; H01L 51/0097; H01L 51/003; H01L 51/56; H01L 51/0024; H01L 2251/5338; H01L 21/6835; H01L 21/76251; H01L 21/76254; H01L 21/02172; H01L 21/76259; H01L 29/78603; H01L 2221/6835; H01L 2221/68359; H01L 31/18; C09J 183/04; C09J 2203/326; C09J 2205/302; C09J 5/00; Y10T 156/1195; Y10T 156/1168; Y10T 156/10; Y10T 428/31681; Y10T 428/31721; Y10T 428/31507; Y10T 428/1064; Y10T 428/1476; H05K 3/007; H05K 1/0393; H05K 1/0306; H05K 2201/0154

USPC ........ 349/122, 158, 138; 156/247, 719, 249, 156/280, 289, 714, 718, 60, 701, 764; 257/E21.122, E21.567; 438/455; 428/1.51, 435, 473.5, 212, 343, 412, 41.8, 428/426

See application file for complete search history.

(56) References Cited

U.S. PATENT DOCUMENTS

| | | |
|---|---|---|
| 2003/0032210 A1 | 2/2003 | Takayama et al. |
| 2003/0047280 A1 | 3/2003 | Takayama et al. |
| 2003/0064569 A1 | 4/2003 | Takayama et al. |
| 2003/0082889 A1 | 5/2003 | Maruyama et al. |
| 2003/0217805 A1 | 11/2003 | Takayama et al. |
| 2004/0232413 A1 | 11/2004 | Yamazaki et al. |
| 2010/0291391 A1 | 11/2010 | Okabe |
| 2012/0118478 A1 | 5/2012 | Park et al. |
| 2012/0187399 A1 | 7/2012 | Fukuda et al. |
| 2013/0020731 A1 | 1/2013 | Kim et al. |
| 2013/0065794 A1* | 3/2013 | Law .................. B01J 19/0046 506/20 |
| 2015/0192819 A1 | 7/2015 | Koo et al. |

FOREIGN PATENT DOCUMENTS

| | | |
|---|---|---|
| KR | 1020100122842 | 11/2010 |
| KR | 1020120031698 | 4/2012 |
| KR | 1020120053601 | 5/2012 |
| KR | 1020130047044 | 5/2013 |

* cited by examiner

METHOD OF MANUFACTURING A DEVICE SUBSTRATE AND A DISPLAY DEVICE MANUFACTURED USING THE SAME

CROSS-REFERENCE TO RELATED APPLICATION

This U.S. non-provisional patent application is a divisional application of U.S. patent application Ser. No. 14/454,089, filed on Aug. 7, 2014, which claims priority under 35 U.S.C. § 119 to Korean Patent Application No. 10-2014-0002950, filed on Jan. 9, 2014, the disclosure of which is incorporated by reference herein in its entirety.

1. TECHNICAL FIELD

The present disclosure relates to a device substrate, and more particularly to a method of manufacturing a device substrate and a display device manufactured using the same.

2. DISCUSSION OF RELATED ART

A display device may include a flat display panel, such as a liquid crystal display device, a field emission display device, a plasma display panel device, or an organic light emitting diode display device. A display device may be included in various electronic devices, such as, for example, a television set or a mobile phone. When a display device is manufactured using a glass substrate without flexibility, the use of the display device may be limited.

In recent years, various attempts have been made to manufacture a curved display device. For example, a curved display device may include a flexible material, such as, for example, a plastic material.

SUMMARY

Exemplary embodiments of the present invention provide a method of manufacturing a flexible device substrate.

Exemplary embodiments of the present invention provide a display device manufactured using the device substrate manufacturing method.

Exemplary embodiments of the present invention provide a device substrate manufacturing method including forming a debonding layer on a carrier substrate. An inorganic adhesive layer is formed on at least a portion of the debonding layer. A process substrate is formed on the carrier substrate. A device is formed on the process substrate, and the process substrate is separated from the carrier substrate.

The debonding layer may have a hydrophobicity greater than a hydrophobicity of the process substrate.

The debonding layer may include a silane compound. The silane compound may include polydimethylsiloxane (PDMS).

The debonding layer may be formed by forming a silane compound layer including a self-assembled monolayer on the carrier substrate and cleaning the carrier substrate.

The inorganic adhesive layer may have a hydrophilicity greater than a hydrophilicity of the debonding layer.

The inorganic adhesive layer may include a metal oxide material. The metal oxide material include of $Al_2O_3$ and/or AlZnO.

The inorganic adhesive layer may be formed by depositing the metal oxide material on the debonding layer.

The inorganic adhesive layer may have an island shape. The inorganic adhesive layer may overlap a portion of the debonding layer.

The inorganic adhesive layer may be formed over an entire surface of the debonding layer.

The process substrate may be formed by forming a curable polymer layer on the carrier substrate on which the debonding layer and the process substrate are formed and curing the curable polymer layer.

The process substrate may include polyethylene terephthalate (PET), polyethylene naphthalate (PEN), polyether sulfone (PES), polycarbonate ester (PC), polysulfone, phenolic resin, epoxy resin, polyester, polyimide, polyetherester, polyetheramide, cellulose acetate, aliphatic polyurethane, polyacrylonitrile, polytetrafluoroethlenes, polyvinylidene fluorides, poly(methyl(x-methacrylates)), aliphatic or cyclic polyolefin, polyarylate, polyetherimide, polyimide, fluoropolymer (like Teflon), poly(etherether ketone), poly(ether ketone), poly(ethylene tetrafluoroethylene) fluoropolymer), poly(methyl methacrylate), and/or arylate/methacrylatecopolymer.

The process substrate may include polyimide.

According to an exemplary embodiment of the present invention, a display device includes a first substrate including a first surface and a second surface opposite to the first surface. A pixel is disposed on the first surface, and a first inorganic adhesive layer is disposed on the second surface. The first inorganic adhesive layer is hydrophobic.

The display device includes a second substrate including a third surface facing the first substrate and a fourth surface opposite to the third surface. A second inorganic adhesive layer is disposed on the fourth surface. The second inorganic adhesive layer is hydrophobic.

The first and second inorganic adhesive layers may include a metal oxide material. The metal oxide material may include $Al_2O_3$ and/or AlZnO.

BRIEF DESCRIPTION OF THE DRAWINGS

The above and other features of the present invention will become more apparent by describing in detail exemplary embodiments thereof, with reference to the accompanying drawings in which.

DETAILED DESCRIPTION

It will be understood that when an element or layer is referred to as being "on", "connected to" or "coupled to" another element or layer, it may be directly on, connected or coupled to the other element or layer or intervening elements or layers may be present. When an element is referred to as being "directly on," "directly connected to" or "directly coupled to" another element or layer, there might not be any intervening elements or layers present. Like numbers may refer to like elements throughout. It will be understood that, although the terms first, second, etc. may be used herein to describe various elements, components, regions, layers and/or sections, these elements, components, regions, layers and/or sections should not be limited by these terms. These terms may be used to distinguish one element, component, region, layer or section from another region, layer or section. Thus, a first element, component, region, layer or section in an exemplary embodiment of the present invention may be termed a second element, component, region, layer or section without departing from the teachings of the present invention.

Spatially relative terms, such as "beneath", "below", "lower", "above", "upper" and the like, may be used herein to describe one element or feature's relationship to another element(s) or feature(s). It will be understood that the spatially relative terms may encompass different orientations of a device in use or operation in addition to the orientation depicted in the figures. For example, if a device in the figures is turned over, elements described as "below" or "beneath" other elements or features may then be oriented "above" the other elements or features. Thus, the exemplary term "below" may encompass both an orientation of above and below. For example, the device may be otherwise oriented (e.g., rotated 90 degrees or to other orientations) and the spatially relative descriptors used herein may be interpreted accordingly.

The terminology used herein is for the purpose of describing exemplary embodiments of the present invention and is not intended to be limiting to the present invention. Hereinafter, exemplary embodiments of the present invention will be described in more detail below with reference to the accompanying drawings.

Figure 1:
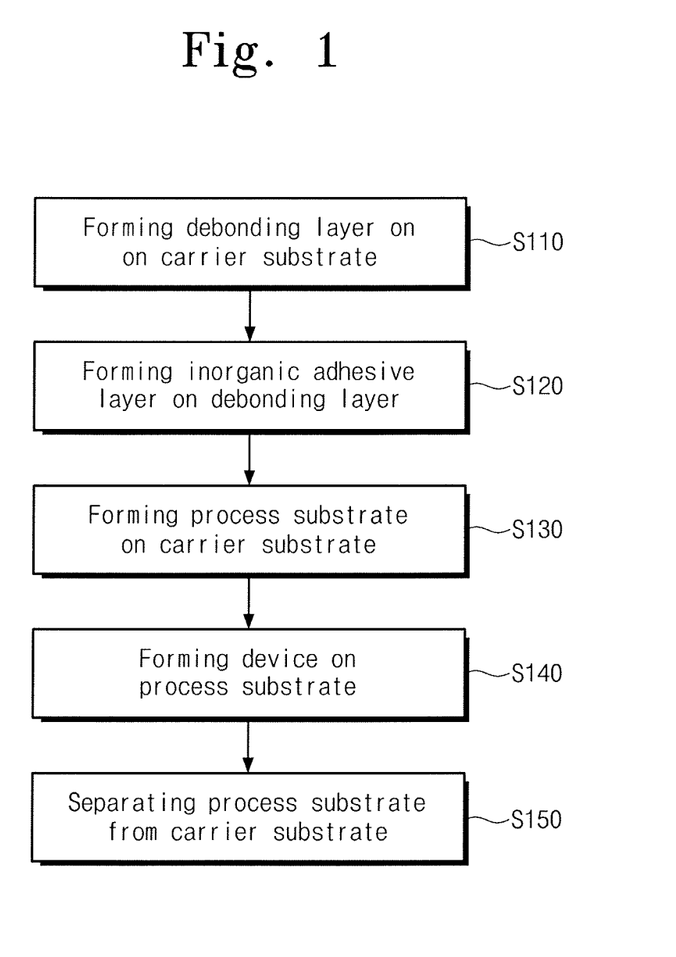
FIG. 1 is a flowchart describing a manufacturing method of a device substrate according to an exemplary embodiment of the present invention.

FIG. 1 is a flowchart describing a manufacturing method of a device substrate according to an exemplary embodiment of the present invention and FIGS. 2A to 2E are cross-sectional views showing a manufacturing method of a device substrate according to an exemplary embodiment of the present invention. The device substrate manufacturing method according to an exemplary embodiment of the present invention will be described in more detail below with reference to FIGS. 1 and 2A to 2E.

Referring to FIG. 1, the device substrate may be manufactured by forming a debonding layer DBL on a carrier substrate CS (S110), forming an inorganic adhesive layer ADL on the debonding layer DBL (S120), forming a process substrate PS on the carrier substrate CS (S130), forming a device on the process substrate PS (S140), and separating the process substrate PS from the carrier substrate CS (S150).

Figure 2A:
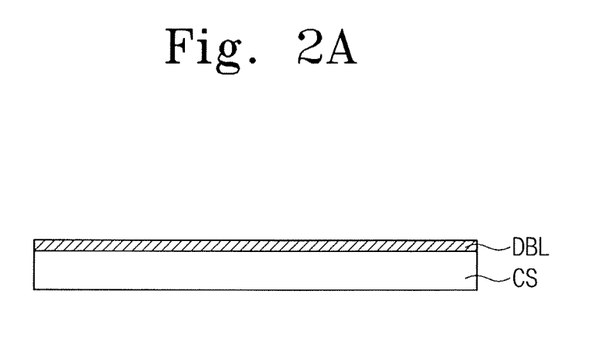
FIGS. 2A to 2E are cross-sectional views showing a manufacturing method of a device substrate according to an exemplary embodiment of the present invention.

Referring to FIGS. 1 and 2A, the carrier substrate CS may be prepared and the debonding layer DBL may be formed on the carrier substrate.

The carrier substrate CS may support the process substrate PS and may have an area equal to or greater than that of the process substrate PS.

The carrier substrate CS may include glass, crystal, an organic-inorganic polymer material, or a fiber reinforced plastic.

The carrier substrate CS may be a rigid substrate without flexibility, but the exemplary embodiments of the present invention should not be limited thereto or thereby. That is, a portion of the carrier substrate CS may be flexible according to a process condition.

The debonding layer DBL may be disposed on a surface of the carrier substrate CS.

The debonding layer DBL may includes a material having a surface energy different from that of the process substrate PS. For instance, the debonding layer DBL may include a material having a hydrophobicity greater than that of the process substrate PS.

The debonding layer DBL may include a silane compound layer. The silane compound layer may be a self-assembled monolayer.

The silane compound layer may be formed by pretreating the carrier substrate CS, forming the self-assembled monolayer on the carrier substrate CS, and cleaning the carrier substrate CS.

The pretreating process may oxidize a portion of the carrier substrate CS before the surface of the carrier substrate CS is modified, so that reactivity in a modification reaction may be increased. In an exemplary embodiment of the present invention, the pretreating process may include a process of treating the surface of the carrier substrate CS using an ultraviolet ray or a process of plasma-treating the surface of the carrier substrate CS using oxygen ($O_2$) and/or ozone ($O_3$). The plasma-treatment process may be performed by loading the carrier substrate CS into a decompression chamber and injecting oxygen ($O_2$) or ozone ($O_3$) into the decompression chamber using a plasma injector for a predetermined time, e.g., about 30 seconds to about 60 seconds.

After pretreating the surface of the carrier substrate CS with ultraviolet rays, $O_2$, and/or $O_3$, an —OH group having high reactivity may be formed on the surface of the carrier substrate CS. The —OH group may allow the self-assembled monolayer to be formed and may increase an adhesive force between the self-assembled monolayer and the carrier substrate CS. The intensity of the ultraviolet rays and the irradiation time of the ultraviolet rays may be determined depending on the material used to form the carrier substrate CS.

The pretreatment process may be omitted based on the materials included in the carrier substrate CS. For example, the pretreatment process may be omitted when the surface of the carrier substrate CS includes a reactive group that reacts with a silane compound of the silane compound layer.

The self-assembled monolayer may be formed by providing a compound on the carrier substrate CS, which interacts with the surface of the carrier substrate CS to provide a compound having a functional group coupled to the surface of the carrier substrate CS in the form of covalent bond, hydrogen bond, or chemical absorption, and two-dimensionally self-aligning the compound on the carrier substrate CS.

The silane compound used to form the self-assembled monolayer may have the following chemical formula 1.

Chemical formula 1

In chemical formula 1, $Z_1$, $Z_2$, $Z_3$, and $Z_4$ may independently denote —H, —$CH_3$, —Cl, —$OCH_3$, —$OCH_2CH_3$, —$OCOCH_3$ or —$OCH_2CH_2CH_3$. One or more of $Z_1$, $Z_2$, $Z_3$, and $Z_4$ may be —H or —$CH_3$. In an exemplary embodiment of the present invention, the silane compound may include polydimethylsiloxane (PDMS).

Silanization of the self-assembled monolayer may be performed in a liquid state or a gaseous state.

A liquid silanization process of the self-assembled monolayer may be performed by preparing a silane compound solution and coating the carrier substrate CS with the silane compound solution. The silane compound solution may include water as a catalyst.

A gaseous silanization process may be performed by loading the carrier substrate CS into a vacuum chamber maintained in a pressure of about 500 Pa together with the silane compound. The vacuum chamber may maintain the temperature and pressure, which are suitable for vaporizing the silane compound. For example, a vapor may be injected into the vacuum chamber as a catalyst to allow the silane compound to be self-assembled on the carrier substrate CS after air in the vacuum chamber is discharged to the outside of the vacuum chamber.

The liquid or gaseous silanization processes, which use water as a catalyst, may be expressed as the following chemical formula 2. For example, $Z_1$ may be a hydrogen atom and each of $Z_2$, $Z_3$, and $Z_4$ may be —Cl in chemical formula 2. Portions represented by a box represent the carrier substrate CS.

Chemical formula 2

The liquid or gaseous silanization processes, which do not use water as a catalyst, may be expressed as the following chemical formula 3. For example, $Z_1$ may be a hydrogen atom, each of $Z_2$ and $Z_4$ may be —$CH_3$, and $Z_3$ may be —$OCH_3$ in chemical formula 3. Portions represented by a box represent the carrier substrate CS.

Chemical formula 3

When the silane compound is self-assembled on the carrier substrate CS, the carrier substrate CS may be cleaned. The carrier substrate CS may be cleaned by a cleaning solution, e.g., deionized water or purified water. During the cleaning process, an overcoat compound having a functional group may be used. The functional group of the overcoat compound might not react with the functional group on the surface of the carrier substrate CS, and foreign substances may be removed. Portions of the silane compound, which are irregularly aligned or stacked, may be removed during the cleaning process. Accordingly, the silane compound may be formed as a uniform monolayer on the carrier substrate CS.

As described above, the self-assembled monolayer may be formed by performing silanization in a liquid state or a gaseous state, but exemplary embodiments of the present invention should not be limited thereto or thereby.

Figure 2B:
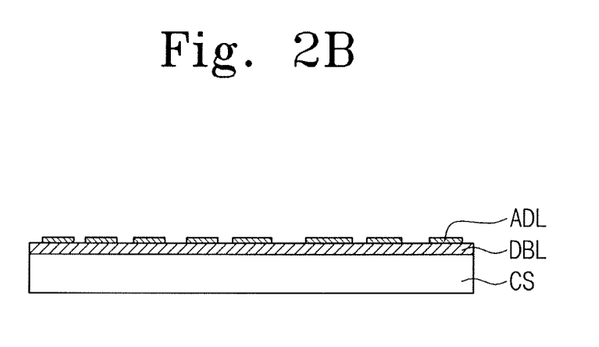

Referring to FIGS. 1 and 2B, the inorganic adhesive layer ADL may be disposed on the debonding layer DBL. The inorganic adhesive layer ADL may attach the process substrate PS to the debonding layer DBL. The inorganic adhesive layer ADL may have a hydrophilicity greater than that of the debonding layer DBL. The inorganic adhesive layer ADL may be formed by the deposition of a metal oxide material containing $Al_2O_3$ and/or AlZnO.

The inorganic adhesive layer ADL may have an island shape when viewed in a plan view. That is, the inorganic adhesive layer ADL may be formed on the debonding layer DBL in a plurality of regions that are spaced apart from each other. The inorganic adhesive layer ADL may overlap a portion of the debonding layer DBL. A material included in the inorganic adhesive layer ADL may be hydrophilic. Thus, the inorganic adhesive layer ADL may be formed to have the island shape while the debonding layer DBL is formed.

The debonding layer DBL may be hydrophobic. Accordingly, when the debonding layer DBL is disposed on the carrier substrate CS without the inorganic adhesive layer ADL disposed on the process substrate PS, the process substrate PS might not be suitably placed on the carrier substrate CS. The inorganic adhesive layer ADL may include a hydrophilic material having lyophilicity with respect to the process substrate PS, and thus the process substrate PS may be stably placed on the carrier substrate CS by the inorganic adhesive layer ADL. The term of "stably placed" used herein may mean that the process substrate PS makes contact with the carrier substrate CS, and that the process substrate PS and the carrier substrate CS are chemically covalently-bonded.

Figure 2C:
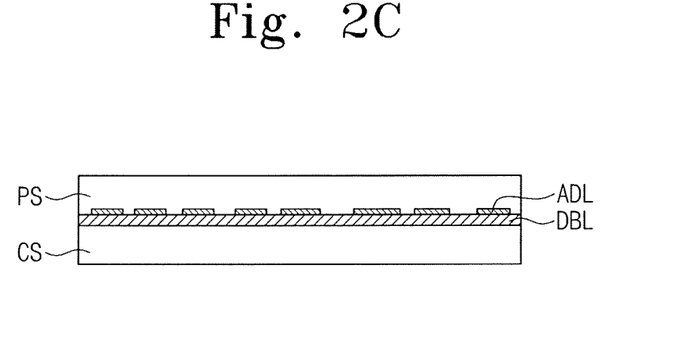

Referring to FIGS. 1 and 2C, the process substrate PS may be formed on the debonding layer DBL. The process substrate PS may be formed by forming a curable polymer layer on the debonding layer DBL and the carrier substrate CS and curing the polymer layer.

The curable polymer layer may be formed on the carrier substrate CS using various methods, e.g., a slit coating method or an inkjet method.

The curable polymer layer may include a polymerizable material, such as a monomer, a dimer, an oligomer or a chemical precursor. The curable polymer layer may be formed by curing a monomer, a dimer, an oligomer, or a chemical precursor.

The curable polymer layer may include polyethylene terephthalate (PET), polyethylene naphthalate (PEN), polyether sulfone (PES), polycarbonate ester (PC), polysulfone, phenolic resin, epoxy resin, polyester, polyimide, polyetherester, polyetheramide, cellulose acetate, aliphatic polyurethane, polyacrylonitrile, polytetrafluoroethlenes, polyvinylidene fluorides, poly(methyl(x-methacrylates)), aliphatic or cyclic polyolefin, polyarylate, polyetherimide, polyimide, fluoropolymer (like Teflon), poly(etherether ketone), poly(ether ketone), poly(ethylene tetrafluoroethylene) fluoropolymer), poly(methyl methacrylate), and/or arylate/methacrylatecopolymer. For example, in an exemplary embodiment of the present invention, the curable polymer layer may include polyimide.

The process substrate PS may be a rigid substrate, but a portion of the process substrate PS may be a soft substrate having flexibility. For example, the entire process substrate PS may be flexible over the entire area thereof. The process substrate PS may have a flexible portion and an inflexible portion. The process substrate PS may include a rigid area that is flexible and a soft area that is not flexible. In an exemplary embodiment of the present invention, the terms "flexible," "inflexible," "having flexibility" and "having no flexibility" or "soft" and "rigid" may be relative terms which represent a property of the process substrate PS. The terms "inflexible," "having no flexibility" and "rigid" may indicate that the portion of the process substrate PS does not have flexibility, or has less flexibility than that of the soft area.

Figure 2D:
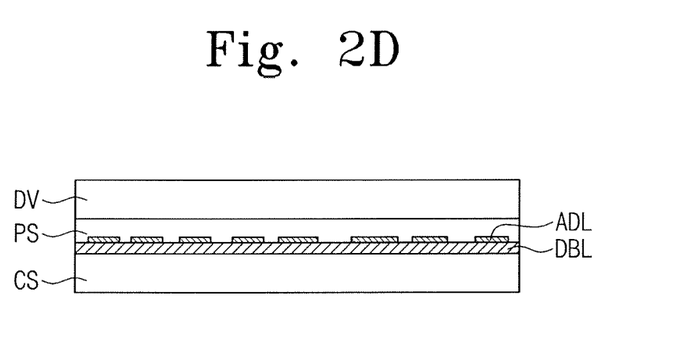

Referring to FIGS. 1 and 2D, the device DV may be formed on the process substrate PS.

The device DV may be various devices, such as, for example, a memory device or a pixel, according to the apparatus to be manufactured.

The process substrate PS may be disposed on the carrier substrate CS when the device DV is formed.

In an exemplary embodiment of the present invention, the device DV may be a pixel applied to a display device. The pixel may include a line part, a thin film transistor connected to the line part, an electrode switched by the thin film transistor, and an image display layer controlled by the electrode.

The line part may include a plurality of gate lines and a plurality of data lines crossing the gate lines.

A plurality of thin film transistors may be included in a passive or active matrix system. When a plurality of thin film transistors is included in the active matrix system, each thin film transistor may be connected to a corresponding gate line and a corresponding data line.

A plurality of electrodes may be included and each electrode may be connected to a corresponding thin film transistor.

Although not shown in figures, each thin film transistor may include a gate electrode, an active layer, a source electrode, and a drain electrode. The gate electrode may be branched from a corresponding gate line. The active layer may be insulated from the gate electrode and the source and drain electrodes may be formed on the active layer to expose a portion of the active layer. The source electrode may be branched from a corresponding data line.

The image display layer may be a liquid crystal layer, an electrophoretic layer, an electrowetting layer or an organic light emitting layer according to the method of displaying the image. The image display layer may be driven in response to voltage(s) applied to the electrode(s). The pixel will be described in more detail below.

Figure 2E:
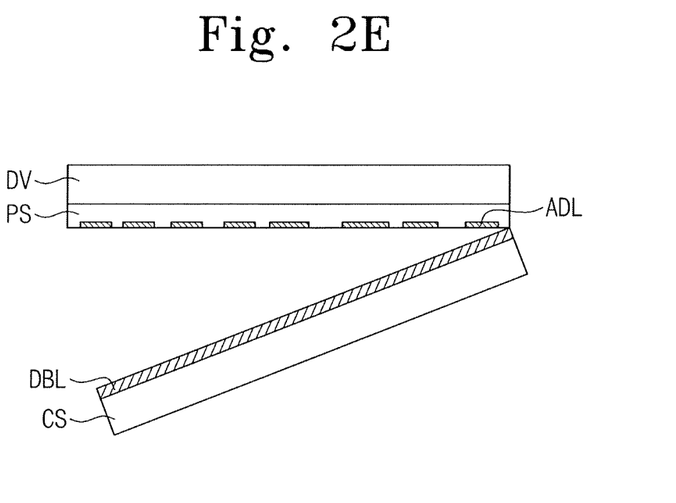

Referring to FIGS. 1 and 2E, the process substrate PS may be separated from the carrier substrate CS.

When the inorganic adhesive layer ADL includes a hydrophilic material, the process substrate PS may be separated from the carrier substrate CS together with the inorganic adhesive layer ADL.

In an exemplary embodiment of the present invention, the separation of the process substrate PS from the carrier substrate CS should not be limited to a specific method. For example, the process substrate PS may be separated from the carrier substrate CS by inserting a wedge or a knife into between the process substrate PS and the carrier substrate CS and applying a force in a direction substantially vertical to an outer surface of the process substrate PS and/or the carrier substrate CS.

The process substrate PS and the carrier substrate CS may be separated from each other by attaching a separation member on each outer surface of the process substrate PS and the carrier substrate CS and outwardly applying a force to the separating member along a direction substantially vertical to an outer surface of the process substrate PS and the carrier substrate CS.

In the separation of the process substrate PS and the carrier substrate CS, the adhesive force between the process substrate PS and the carrier substrate CS may become weaker when the process substrate PS includes the debonding layer DBL. Van der waals forces and/or electrostatic forces may act between the debonding layer DBL and the carrier substrate CS, and thus an attractive force may act between the process substrate PS and the carrier substrate CS. When a difference in surface energy between the process substrate PS and the carrier substrate CS is large and the debonding layer DBL of the process substrate PS is hydrophobic, the attractive force may be smaller. Therefore, the process substrate PS may be separated from the carrier substrate CS with a relatively small force, and the process substrate PS may be prevented from being damaged when the process substrate PS is separated from the carrier substrate CS.

When a flexible substrate is loaded onto robot arms in order to transfer the flexible substrate, the flexible substrate may be bent and dropped down from the robot arms.

According to exemplary embodiments of the present invention the device may be manufactured on the process substrate PS while the process substrate PS is attached to the carrier substrate CS, and thus the device may be stably formed on the process substrate PS, which may be flexible. The process substrate PS may be separated from the carrier substrate CS. The debonding layer DBL may be formed on the carrier substrate CS. The debonding layer may include a metal oxide material and/or the silane compound. The inorganic adhesive layer ADL may be formed on the debonding layer DBL. An attractive force acting between the process substrate PS and the carrier substrate CS may be maintained at a desired level, so that the device DV may be formed and the debonding of the process substrate PS and the carrier substrate CS may be performed.

According to an exemplary embodiment of the present invention, damage caused to the process substrate PS when the process substrate PS is separated from the carrier substrate CS may be reduced.

According to an exemplary process, a laser beam may be radiated onto a interface between a process substrate and a carrier substrate to separate the process substrate from the carrier substrate, or an organic polymer layer may be formed on the carrier substrate as a debonding layer. However, the transparency of the process substrate irradiated with the laser beam may be reduced and a life span of devices vulnerable to the laser beam may be shortened. When the organic polymer layer is used as the debonding layer, a gas may be discharged from the organic polymer layer during a high temperature process performed to cure the process substrate or to form the device. As a result, bubble defects may occur in the process substrate.

When a laser beam is not used according to an exemplary embodiment of the present invention, the process substrate PS may be prevented from being damaged. When the debonding layer DBL and the inorganic adhesive layer ADL are included in the device substrate, the amount of gas discharged from the debonding layer DBL and the inorganic adhesive layer ADL may be smaller than that of an organic polymer layer, thereby reducing the occurrence of bubble defects.

Figure 3:
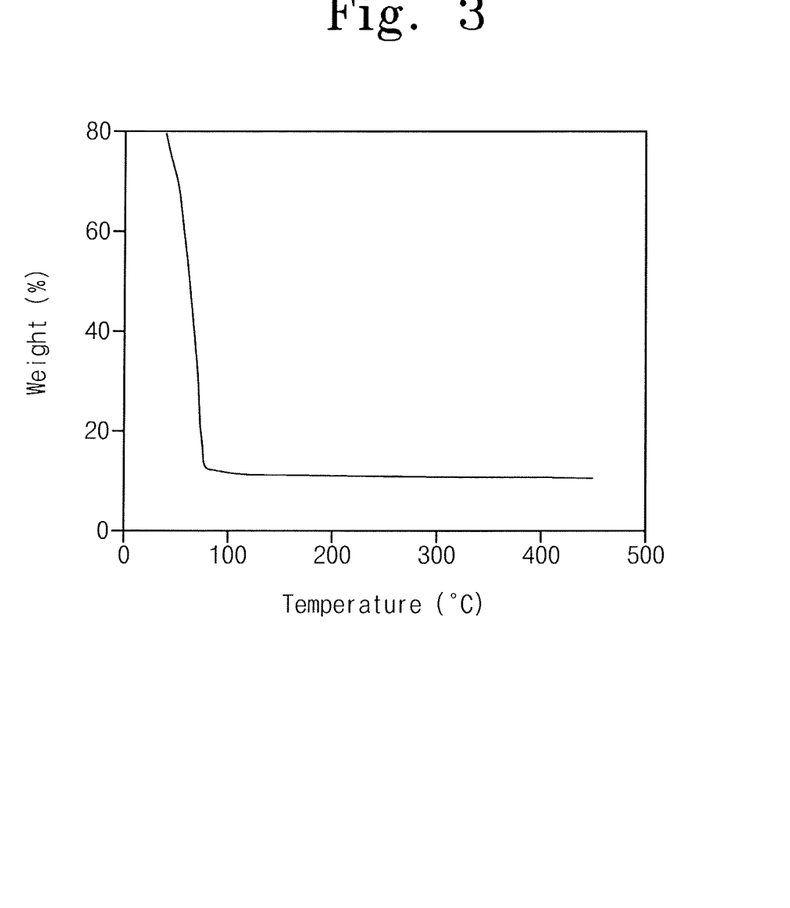
FIG. 3 is a graph showing a weight of a process substrate as a function of a temperature in a process substrate manufactured by the device substrate manufacturing method according to an exemplary embodiment of the present invention.

FIG. 3 is a graph showing a weight of a process substrate as a function of a temperature in a process substrate manufactured by the device substrate manufacturing method according to an exemplary embodiment of the present invention. In FIG. 3, a variation in weight of the curable polymer layer has been represented while a temperature is increased on the assumption that an initial weight of the curable polymer layer formed on the carrier substrate is 100 percent.

Referring to FIG. 3, when the temperature is equal to or smaller than about 100° C., the weight of the process substrate is decreased as the temperature is increased. This is because a solvent in the curable polymer layer is evaporated when the curable polymer layer starts to be cured. However, when the temperature becomes greater than about 100° C., the weight of the process substrate is not substantially changed. This is because no additional gas is discharged from the curable polymer layer even though the temperature becomes greater than about 100° C.

Accordingly, although the process substrate is exposed to the high temperature when the device is formed on the process substrate after the process substrate is manufactured, gas might not be discharged. Therefore, bubble defects caused by discharged gas do not occur.

According to an exemplary embodiment of the present invention, the inorganic adhesive layer ADL may be formed on the carrier substrate CS in the island shape, but it should not be limited to the island shape. That is, the inorganic adhesive layer ADL may be formed over the entire surface of the carrier substrate CS.

Figure 4:
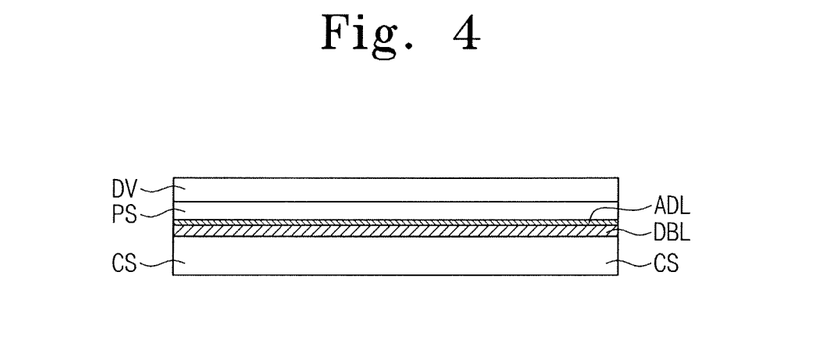
FIG. 4 is a cross-sectional view showing an inorganic adhesive layer disposed on a carrier substrate according to exemplary embodiments of the present invention.

FIG. 4 is a cross-sectional view showing an inorganic adhesive layer formed on a carrier substrate according to exemplary embodiments of the present invention.

Referring to FIG. 4, the inorganic adhesive layer ADL may be formed over the entire surface of the carrier substrate CS. The inorganic adhesive layer ADL may have a thickness that is thicker than that of the inorganic adhesive layer ADL shown in FIG. 2B. In the device substrate manufacturing method according to an exemplary embodiment of the present invention, the process substrate PS may be stably disposed on the carrier substrate CS by the inorganic adhesive layer ADL, and the process substrate PS may be separated from the carrier substrate CS after the device is formed.

The use of the device substrate manufacturing method according to exemplary embodiments of the present invention should not be limited to a specific field and the device substrate manufacturing method may be used to form devices on a thin substrate. For example, the display device may be manufactured by using the device substrate manufacturing method.

Hereinafter, the display device manufactured by the display device manufacturing method according to an exemplary embodiment of the present invention will be described in more detail.

Figure 5:
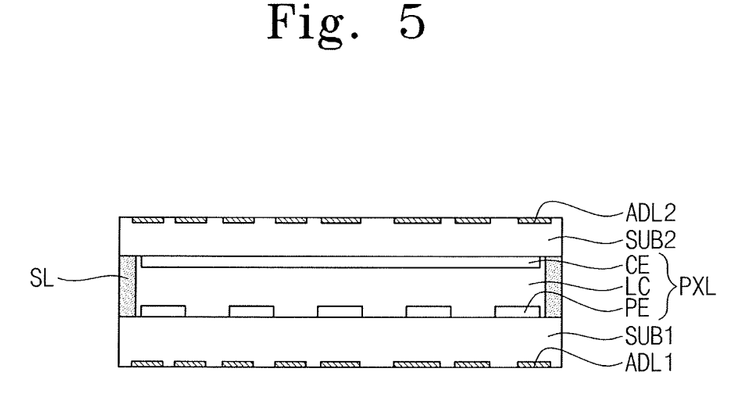
FIG. 5 is a cross-sectional view showing a display device manufactured by a display device manufacturing method according to an exemplary embodiment of the present invention.

FIG. 5 is a cross-sectional view showing a display device manufactured by a display device manufacturing method according to an exemplary embodiment of the present invention.

Referring to FIG. 5, the display device may include a first substrate SUB1, a second substrate SUB2 facing the first substrate SUB1, and a pixel PXL disposed between the first substrate SUB1 and the second substrate SUB2.

The first substrate SUB1 may include a first surface and a second surface, which are opposite to each other. The first surface of the first substrate SUB1 may face the second substrate SUB2.

The pixel PXL may be disposed on the first substrate SUB1. The pixel PXL may include one or more electrodes and an image display layer driven by the electrode. When the display device is a liquid crystal display device, the electrode may include two electrodes spaced apart from each other, e.g., a first electrode and a second electrode. The first and second electrodes may form an electric field. The first electrode may be referred to as a pixel electrode PE and the second electrode may be referred to as a common electrode CE. As shown in FIG. 5, the first and second electrodes may be represented as the pixel electrode PE and the common electrode CE, respectively, and the image display layer may be represented as a liquid crystal layer LC.

The second substrate SUB2 may include a third surface and a fourth surface, which are opposite to each other. The third surface of the second substrate SUB2 may face the first surface of the first substrate SUB1.

The second substrate SUB2 may include a same or different material as the first substrate SUB1. For example, in an exemplary embodiment of the present invention, the first and second substrates SUB1 and SUB2 may include polyimide, but they should not be limited thereto or thereby. According to an exemplary embodiment of the present invention, the first substrate SUB1 may include polyimide and the second substrate SUB2 may include polyethersulfone.

A sealing part SL may be disposed between the first substrate SUB1 and the second substrate SUB2. The sealing part SL may be disposed along edges of the first and second substrates SUB1 and SUB2 when viewed in a plan view. The sealing part SL may seal the liquid crystal layer LC.

In an exemplary embodiment of the present invention, the second substrate SUB2 may face the first substrate SUB1, but the second substrate SUB2 may be omitted. For example, the pixel PXL may be disposed on the first substrate SUB1 and a sealing layer may be formed on the pixel PXL.

Although not shown in the figures, the pixel PXL may include a line part and a thin film transistor. The line part may include gate lines and data lines and the thin film transistor may be connected to the gate lines and the data lines. The thin film transistor may be connected to the pixel electrode PE of the pixel.

First and second inorganic adhesive layers ADL1 and ADL2 may be respectively disposed on the second surface of the first substrate SUB1 and the fourth surface of the second substrate SUB2.

When a gate signal is applied to the gate line, the thin film transistor may be turned on. A data signal applied to the data line may be applied to the pixel electrode PE through the turned-on thin film transistor. When the data signal is applied to the pixel electrode PE, an electric field may be formed between the pixel electrode PE and the common electrode CE. Liquid crystal molecules of the liquid crystal layer LC may be aligned by the electric field generated by a difference in voltages between a voltage applied to the pixel electrode PE and a voltage applied to the common electrode CE. A transmittance of the light passing through the liquid crystal layer LC may be changed, and thus a desired image may be displayed.

FIGS. 6A to 6F are cross-sectional views showing the display device manufacturing method of FIG. 5. The following descriptions may focus on different features from the features described above.

Figure 6A:
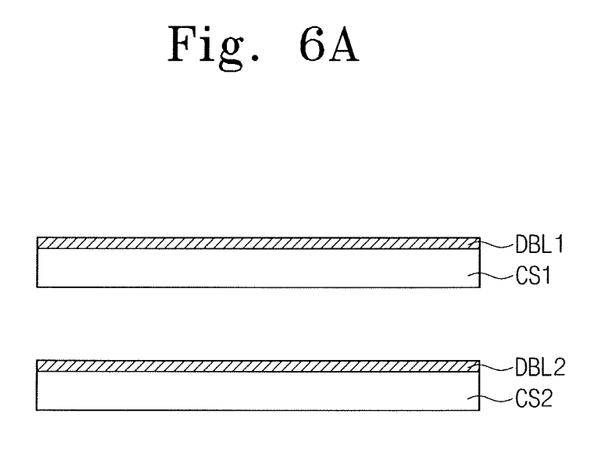
FIGS. 6A to 6F are cross-sectional views showing the display device manufacturing method of FIG. 5.

Referring to FIG. 6A, a first debonding layer DBL1 may be formed on a first carrier substrate CS1 and a second debonding layer DBL2 may be formed on a second carrier substrate CS2. Each of the first and second debonding layers DBL1 and DBL2 may include the silane compound layer.

Figure 6B:
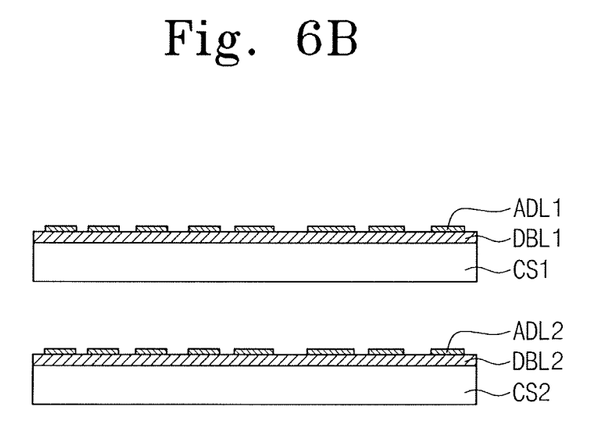

Referring to FIG. 6B, a first inorganic adhesive layer ADL1 may be formed on the first debonding layer DBL1 and a second inorganic adhesive layer ADL2 may be formed on the second debonding layer DBL2.

Figure 6C:
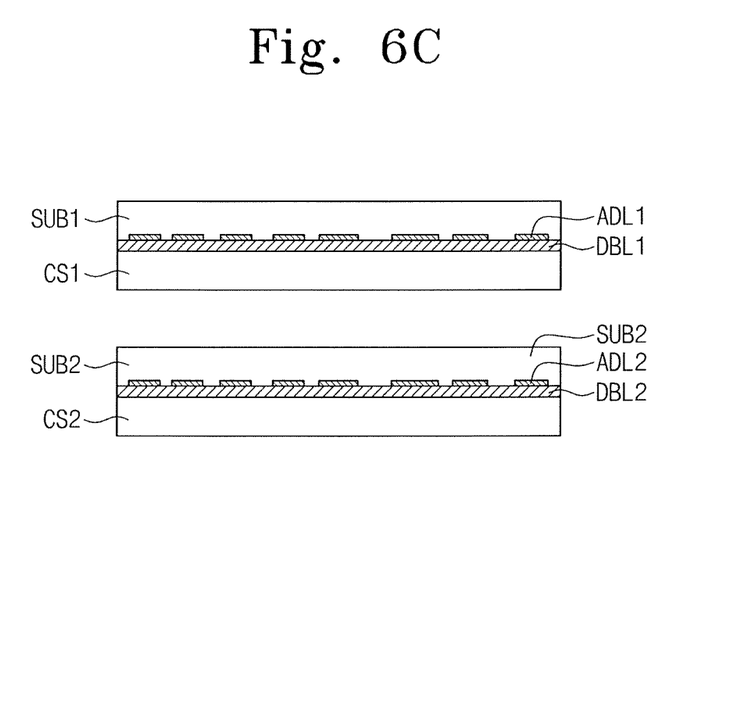

Referring to FIG. 6C, the first substrate SUB1 may be formed on the first carrier substrate CS1, on which the first debonding layer DBL1 and the first inorganic adhesive layer ADL1 are formed. The first substrate SUB1 may be a process substrate. The second substrate SUB2 may be formed on the second carrier substrate CS2, on which the second debonding layer DBL2 and the second inorganic adhesive layer ADL2 are formed. The second substrate SUB2 may be a process substrate.

Figure 6D:
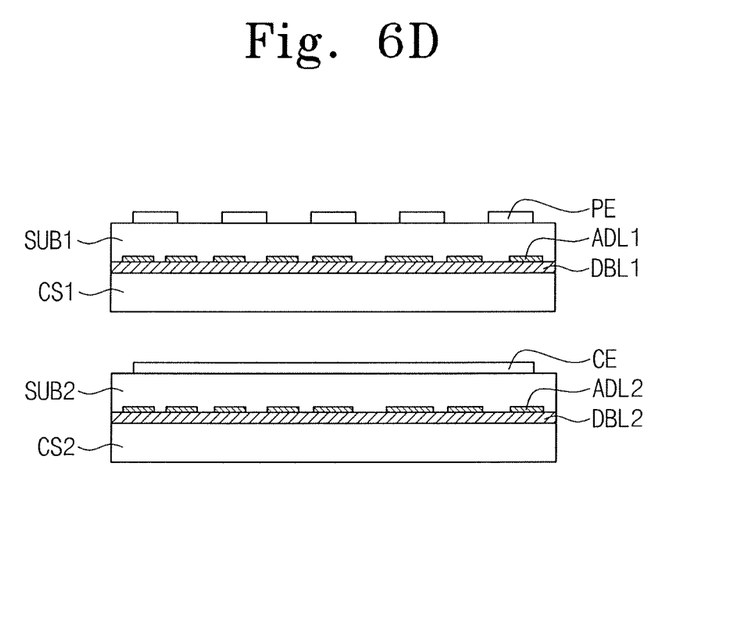

Referring to FIG. 6D, various devices including a pixel electrode PE may be formed on the first substrate SUB1. A common electrode CE may be formed on the second substrate SUB2.

The pixel electrode PE may be formed by depositing a transparent conductive material on the first substrate SUB1 and patterning the transparent conductive material using a photolithography process. The common electrode CE may be formed by depositing a transparent conductive material on the second substrate SUB2 and patterning the transparent conductive material using a photolithography process. The line part and the thin film transistor may be formed on the first substrate SUB1, and the gate lines, the data lines, and the thin film transistor may be formed by performing a photolithography process several times. However, the method of forming the pixel electrode PE and the common electrode CE should not be limited to a particular process.

The processes of forming the pixel electrode PE, the common electrode CE, the gate lines, the data lines, and the thin film transistor may be performed on the first and second substrates SUB1 and SUB2, respectively. The first and second substrates SUB1 and SUB may be supported by the first and second carrier substrates CS1 and CS2. Thus, although the first and second substrates SUB1 and SUB2 may be thin and/or flexible, the first and second substrates SUB1 and SUB2 may be maintained in a flat state by the first and second carrier substrates CS1 and CS2.

Figure 6E:
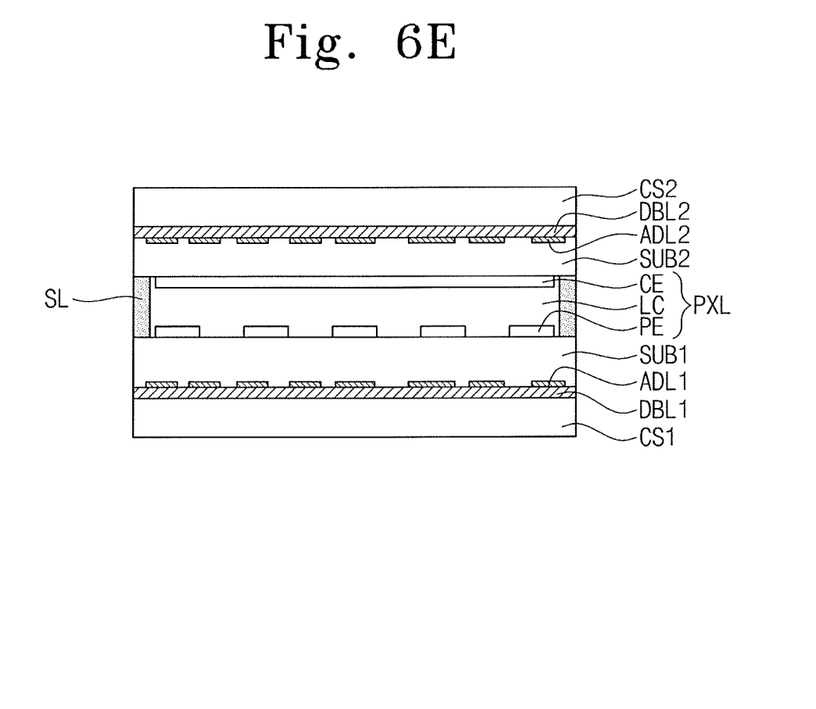

Referring to FIG. 6E, the liquid crystal layer LC may be formed between the first and second substrates SUB1 and SUB2. The liquid crystal layer LC may be formed by a one drop filling (ODF) scheme. A sealant SL may be disposed at edges of the first and second substrates SUB1 and SUB2 to prevent the liquid crystal layer LC from leaking. The sealant SL may be disposed on the first substrate SUB1 or the second substrate SUB2 before the liquid crystal layer LC is formed between the first and second substrates SUB1 and SUB2 and cured after the liquid crystal layer LC is formed between the first and second substrates SUB1 and SUB2, thereby sealing the liquid crystal layer LC.

Figure 6F:
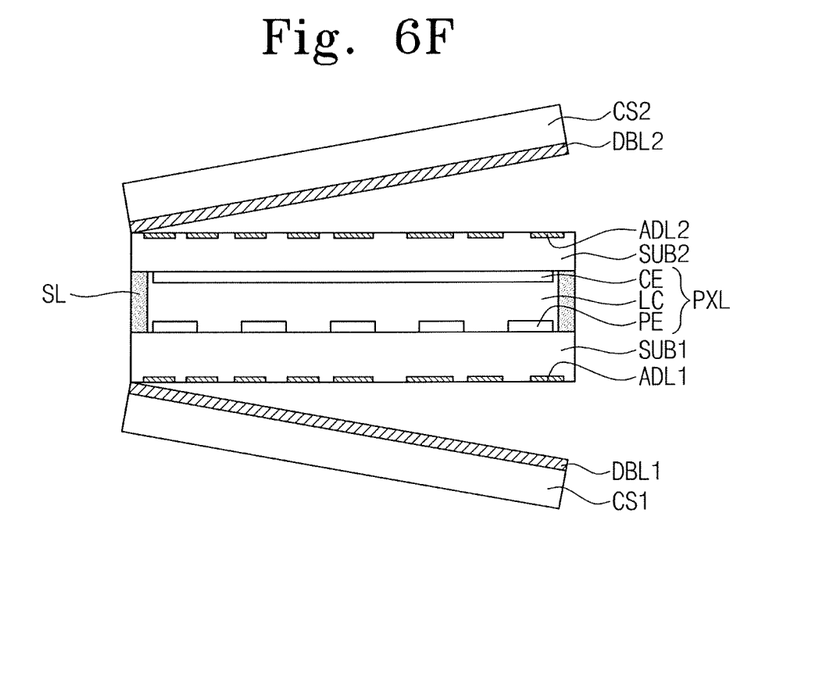

Referring to FIG. 6F, the first and second carrier substrates CS1 and CS2 may be removed from the display device. The first carrier substrate CS1 may be separated from the first substrate SUB1 and the second carrier substrate CS2 may be separated from the second substrate SUB2. The separations of the first and second carrier substrates CS1 and CS2 from the first and second substrates SUB1 and SUB2 may be performed according to the exemplary methods described above.

In an exemplary embodiment of the present invention, the separation of the first carrier substrate CS1 from the first substrate SUB1 and the separation of the second carrier substrate CS2 from the second substrate SUB2 may be performed by the first and second debonding layers DBL1 and DBL2. When surfaces of the display device corresponding to the first and second debonding layers DBL1 and DBL2 are hydrophobic, the adhesive forces between the first substrate SUB1 and the first carrier substrate CS1 and between the second substrate SUB2 and the second carrier substrate CS2 may be relatively weak.

While the present invention has been particularly shown and described with reference to exemplary embodiments thereof, it will be understood by those of ordinary skill in the art that various changes in form and detail may be made therein without departing from the spirit and scope of the present invention.

What is claimed is:

1. A method of manufacturing a device substrate, comprising:
    forming a debonding layer on a carrier substrate;
    forming an inorganic adhesive layer on at least a portion of the debonding layer;
    forming a process substrate on the carrier substrate;
    forming a device on the process substrate; and
    separating the process substrate adhered to the inorganic adhesive layer from the carrier substrate adhered to the debonding layer.

2. The method of claim 1, wherein the debonding layer has a hydrophobicity greater than a hydrophobicity of the process substrate.

3. The method of claim 2, wherein the debonding layer comprises a silane compound.

4. The method of claim 3, wherein the silane compound comprises polydimethylsiloxane (PDMS).

5. The method of claim 3, wherein the forming of the debonding layer further comprises:
    forming a silane compound layer including a self-assembled monolayer on the carrier substrate; and
    cleaning the carrier substrate.

6. The method of claim 1, wherein the inorganic adhesive layer has a hydrophilicity greater than a hydrophilicity of the debonding layer.

7. The method of claim 6, wherein the inorganic adhesive layer comprises a metal oxide material.

8. The method of claim 7, wherein the metal oxide material comprises $Al_2O_3$ or AlZnO.

9. The method of claim 7, wherein the inorganic adhesive layer is formed by depositing the metal oxide material on the debonding layer.

10. The method of claim 9, wherein the inorganic adhesive layer has an island shape, and wherein the inorganic adhesive layer overlaps a portion of the debonding layer.

11. The method of claim 9, wherein the inorganic adhesive layer is formed over an entire surface of the debonding layer.

12. The method of claim 1, wherein the forming of the process substrate comprises:
    forming a curable polymer layer on the carrier substrate on which the debonding layer and the process substrate are formed; and
    curing the curable polymer layer.

13. The method of claim 12, wherein the process substrate comprises polyethylene terephthalate (PET), polyethylene naphthalate (PEN), polyether sulfone (PES), polycarbonate ester (PC), polysulfone, phenolic resin, epoxy resin, polyester, polyimide, polyetherester, polyetheramide, cellulose acetate, aliphatic polyurethane, polyacrylonitrile, polytetrafluoroethlenes, polyvinylidene fluorides, poly(methyl(x-methacrylates)), aliphatic or cyclic polyolefin, polyarylate, polyetherimide, polyimide, fluoropolymer (like Teflon), poly(etherether ketone), poly(ether ketone), poly(ethylene tetrafluoroethylene) fluoropolymer), poly(methyl methacrylate), or arylate/methacrylatecopolymer.

14. The method of claim 13, wherein the process substrate comprises polyimide.

15. A device substrate, comprising:
    a carrier substrate;
    a debonding layer disposed on the carrier substrate, wherein the debonding layer is hydrophobic, and wherein the debonding layer comprises a silane compound;
    an inorganic adhesive layer disposed on the debonding layer, wherein the inorganic adhesive layer is hydrophilic; and
    a process substrate disposed on the inorganic adhesive layer, wherein an adhesive strength between the inorganic adhesive layer and the process substrate is greater than an adhesive strength between the inorganic adhesive layer and the debonding layer.

16. The device substrate of claim 15, wherein the inorganic adhesive layer is only formed on a portion of the debonding layer.

* * * * *